United States Patent

[11] 3,553,356

[72] Inventor Hans-Robert Groll
Darmstadt-Eberstadt, Germany
[21] Appl. No 690,544
[22] Filed Dec. 14, 1967
[45] Patented Jan. 5, 1971
[73] Assignee Fernseh G.m.b.H.
Darmstadt, Germany
[32] Priority Dec. 16, 1966
[33] Germany
[31] No. F50970

[54] METHOD AND SYSTEM FOR GENERATING COLOR TELEVISION SIGNALS WITHOUT LOSS OF VERTICAL RESOLUTION
15 Claims, 11 Drawing Figs.

[52] U.S. Cl. .......... 178/5.4
[51] Int. Cl. .......... H04n 9/42
[50] Field of Search .......... 178/5.4, 5.4CR, 5.4(2), 5.4(3), 5.2

[56] References Cited
UNITED STATES PATENTS

| | | | |
|---|---|---|---|
| 2,701,275 | 2/1955 | Hulst | 178/5.4 |
| 2,724,737 | 11/1955 | Hogan | 178/5.4 |
| 2,969,425 | 1/1961 | Hughes | 178/5.4(CR) |
| 2,995,619 | 8/1961 | Freeman | 178/5.2 |
| 3,255,303 | 6/1966 | Kihara | 178/5.4(CR) |

*Primary Examiner*—Richard Murray
*Assistant Examiner*—Alfred H. Eddleman
*Attorney*—Michael S. Striker

ABSTRACT: The photosensitive surface of a color television tube contains three images, corresponding to the three primary colors, of an object to be televised. These three images are scanned sequentially in a time period corresponding to the standard line interval, the time for scanning each color image thus being a third of a standard line interval. Each of these compressed color signals is stored in a separate storage location. Each storage location is then scanned separately in a time corresponding to the full line interval. The thus generated full length color signals are then furnished simultaneously for transmission.

Inventor:
Hans-Robert Groll by Michael J. Striker
Attorney

Inventor:
Hans-Robert Groll by Richard J. Hecker

Attorney

Inventor:
Hans-Robert Groll
by
Attorney

Inventor:
Hans-Robert Groll
by
[signature]
Attorney

Inventor:
Hans-Robert Groll by
Michael S. Striker

Attorney

Inventor:
Hans-Robert Groll by [signature]

Attorney

METHOD AND SYSTEM FOR GENERATING COLOR TELEVISION SIGNALS WITHOUT LOSS OF VERTICAL RESOLUTION

BACKGROUND OF THE INVENTION

This invention relates to systems and methods for generating color value signals by means of a camera tube on to whose photosensitive surface a plurality of images of the object to be televised is projected, each of said images corresponding to a separate spectral region.

A method for television transmission in natural colors is already known, in which a plurality of partial images of the same object is projected onto the photocathode of the camera tube, said partial images scanned analogously to a continuous picture, and the resulting color signals transmitted over a single channel.

The drawback in this known method is that for a standard line interval (for example 64 microseconds for a 625 line standard frame) the number of scanned lines of each image on said photosensitive surface is smaller than the standard number of lines per frame, thus resulting in a decrease of vertical resolution. This loss of information in the vertical direction leads to disturbing color edges.

SUMMARY OF THE INVENTION

This invention thus constitutes a method for generating color signals, without loss of vertical resolution, for a color television camera wherein the time period for scanning a horizontal line is a line interval.

According to this method, a plurality of images, each in a predetermined spectral range, of an object to be televised is projected onto the photosensitive surface of the television camera tube. Substantially corresponding lines of said plurality of images are scanned sequentially in a time period corresponding to said line interval, thus generating a corresponding plurality of compressed color signals, each having a time duration shorter than said line interval. These sequential compressed color signals are converted into simultaneous color signals each having a time duration corresponding to said line interval, thus furnishing a plurality of color signals for each horizontal line as required for full vertical resolution.

In a preferred embodiment of the method according to this invention, the signals corresponding to each line of each image are separately stored in corresponding storage locations and each is then read out during a time period corresponding to said line interval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
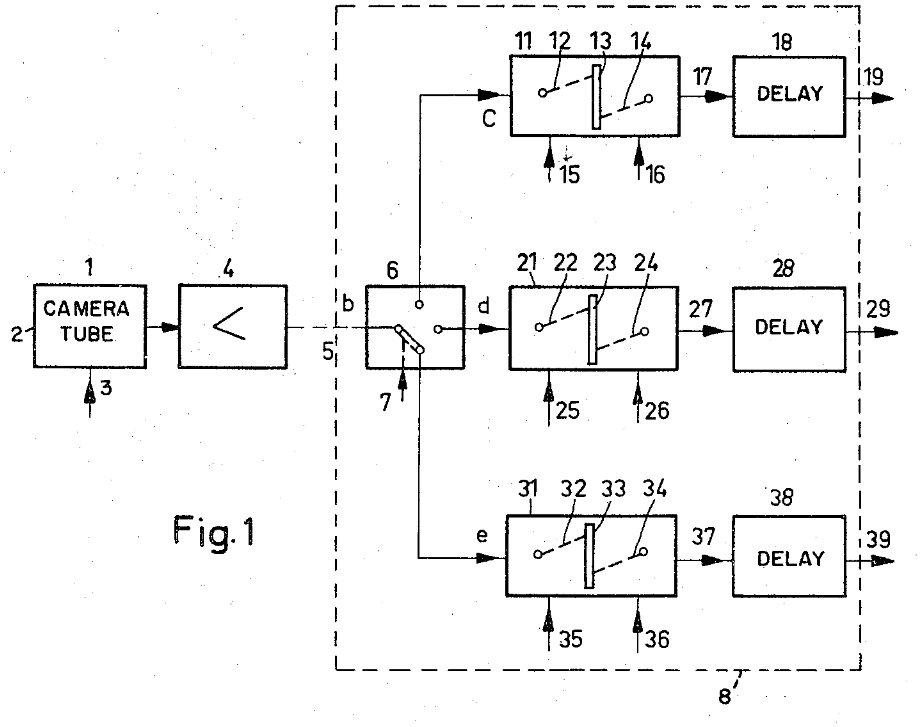
FIG. 1 shows an embodiment of this invention in which three separate images in different spectral regions are projected onto the photosensitive layer of the camera, said system having three line storage elements, one for each of said images.

FIG. 1 shows a camera tube 1, on whose photosensitive layer 2 three images of the object to be televised are projected next to each other in the direction of the line, or underneath each other perpendicular to the direction of the line, by means of an optical system which is not shown. Each of said images corresponds to a different spectral region. The sawtooth voltages or currents for deflection of the scanning beam in the line direction are furnished at 3. The scanning of all three images takes place sequentially, the total time for such scanning corresponding to the time of a standard line interval. If this, for example, is 64 microseconds, 21Δ microseconds, or a third of the standard line interval, are available for scanning of each line of each image. Under the assumption that three images in the primary colors of red, green, and blue are projected onto the photosensitive layer 2 of camera tube 1 and that these images are scanned in this sequence, each in a third of the standard line interval, then the camera tube furnishes compressed color signals for red, green and blue, each in a third of the line interval during a standard line interval. Since the information contained in each line of each image is scanned in one-third of the standard line interval, a band width of three times the normal value is required if the same resolution is to be obtained as is obtained by scanning in the standard line interval.

In order to obtain the same resolution on a line length corresponding to one-third of the standard line length as is obtained in a full line length, the resolution of the camera tube in the line direction must be three times as a large as that required when the image occupies the full photosensitive surface.

This is not the case for cameras in the present state of the art. The limits of resolution of current standard camera are as a rule only slightly higher than the standard frequency limit of the video signal (for example 5 MHz). Thus for a resolution which is limited by the resolution of the camera to, for example, 5 MHz., the corresponding resolution of the three color signals will be limited to a third of the band width, that is approximately 1.7 MHz. However, as is well known, the smaller band width is entirely adequate for such color signals.

If for any reason it is required to generated color television signals with the full resolution of the system, then a second camera tube for the generation of the brightness signal is required. For lesser resolution requirement for the television picture, the color television signal consisting of the three color signals may be used for the generation of the brightness signal without use of an additional camera tube.

In the signal generated by camera tube 1, the compressed color signals, namely the color signals for green, red, and blue, follow each other during each line interval. After amplification in the preamplifier 4, the signals are fed to an electronic switch 6 which causes each of the said three color signals to be entered into a corresponding one of the three storage elements 11, 21 and 31, so that for example storage element 11 contains only the color signals for the "red" image, storage element 21 contains only the color signal corresponding to the "green" image, and storage element 31 only the color signal corresponding to the "blue" image. For this purpose, the electronic switch 6 is driven synchronously to the deflection signals applied at the point 3 of the camera tube by means of a sequence of pulses applied at point 7. This electronic switch is the first element in the means for converting the sequential compressed color signals into simultaneous color signals of line interval duration, designated 8 in FIG. 1.

As an embodiment of the storage means, FIG. 1 shows a schematic representation of three electrostatic storage elements, having storage electrodes 13, 23 and 33, respectively, for receiving the corresponding compressed color signals which are entered by means of a write-in electron beam modulated by said respective signals. The write-in electron beams 12, 22, and 23 are deflected over storage electrodes 13, 23, and 33, respectively, by means of deflection signals (voltages for electrostatic deflection, currents for electromagnetic deflection) applied at points 15, 25 and 35, respectively. The period of time for one deflection of the write-in beams 12, 22 and 23 respectively, is equal to the length of time necessary for scanning one line of the images on the photosensitive layer 2 of camera tube 1; thus for a standard line interval of 64 microseconds said time of deflection is also 21⅓ microseconds.

The color signals stored in storage locations 13, 23 and 33, respectively, are then read out by means of second electron beams 14, 24 and 34, respectively. The readout process takes place within the time interval corresponding to the line interval, and thus takes place three times more slowly than the write-in period.

Figure 2:
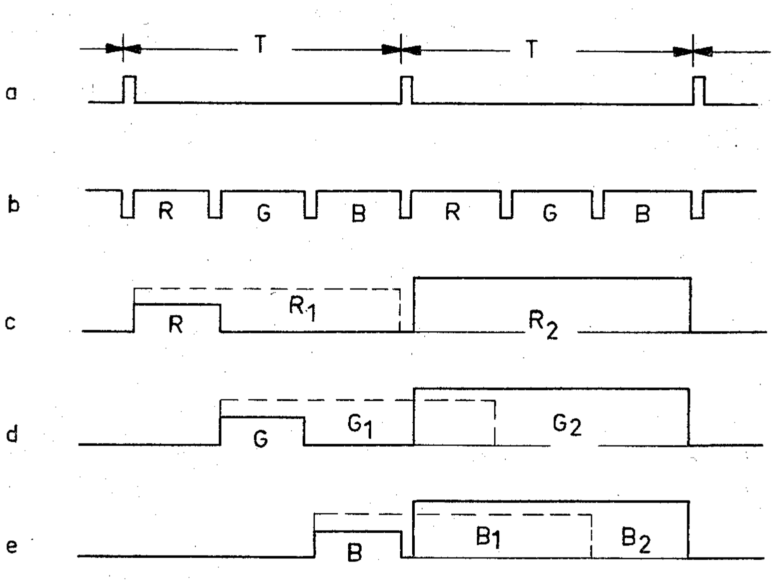
FIG. 2 is a timing diagram showing the signals at different points in the system of FIG. 1.

FIG. 2 shows a timing diagram for this process. Line *a* shows a sequence of line frequency synchronization pulses which determine the line interval T of, for example, 64 microseconds. Line *b* shows a sequence of compressed color signals, which are generated by the scanning of the images on the photosensitive surface of the camera tube and which appear in sequence within the line interval. The following three lines show the compressed color signals furnished to the inputs of the three storage elements after distribution by the electronic switch 6. The "red" compressed color signal R is shown at the input of storage location 11, in line *c*. The "green" compressed color signal G is shown at the input of storage element 21 in line *d*, and the "blue" compressed color signal B is shown at the input of storage element 31 in line *e*. The signals resulting from the conversion of the compressed color signals into signals, having a duration corresponding to the line interval, which result from the readout, are shown in dashed lines in lines *c, d*, and *e*, respectively. Here it is assumed that the readout commences at the same time as the write-in. Thus each readout is completed before the corresponding color signal for the next line interval arrives, so that the storage location is again available.

Color signals $R_1$, $G_1$ and $B_1$ are each delayed in corresponding delay means 18, 28 and 38 for an appropriate amount of time so that they become available for simultaneous transmission. Thus color signal $R_1$ is delayed in delay means 18 for a full line interval, the "green" color signal $G_1$ is delayed by two-thirds of this value, while the "blue" color signal $B_1$ is delayed by a third of the line interval T. Thus the three simultaneous color signals $R_2$, $G_2$ and $B_2$ are available at the outputs 19, 29 and 39, of the respective delay elements 18, 28 and 38 and are thus available for the formation of a color television signal by coding in the conventional fashion.

Currently, glass delay lines may be used as the delay elements 18, 28 and 38 with delay times up to the line interval, for example 64 microseconds, which are required in the arrangement of FIG. 1. These delay lines can only transmit a carrier frequency signal of the same frequency as the resonant frequency of the delay line. It is thus necessary to modulate the video frequency signals, which are read out from the storage elements, onto a carrier frequency and to demodulate the carrier frequency signals after they have passed through the delay lines. This process is not shown in the FIG.

The use of such delay lines with their attendant disadvantages can be avoided by assigning two storage elements to each image instead of one as shown in FIG. 1. For example for three images, six storage elements would be used. This is shown schematically in FIG. 3. The first group of three storage elements 41, 51 and 61 stores the three compressed color signals R, G and B within a given line interval, as in the arrangement of FIG. 1 A second group of three further storage elements 71, 81 and 91 stores the compressed color signals corresponding to the following line interval. The electronic switch 8 in FIG. 3, used for distribution of the compressed color signals to the individual storage elements thus has six positions. Those outputs of the storage elements in each group which carry the compressed color signals corresponding to the same image are interconnected and the outputs for the three images are furnished at 19, 29 and 39, respectively.

Figure 3:
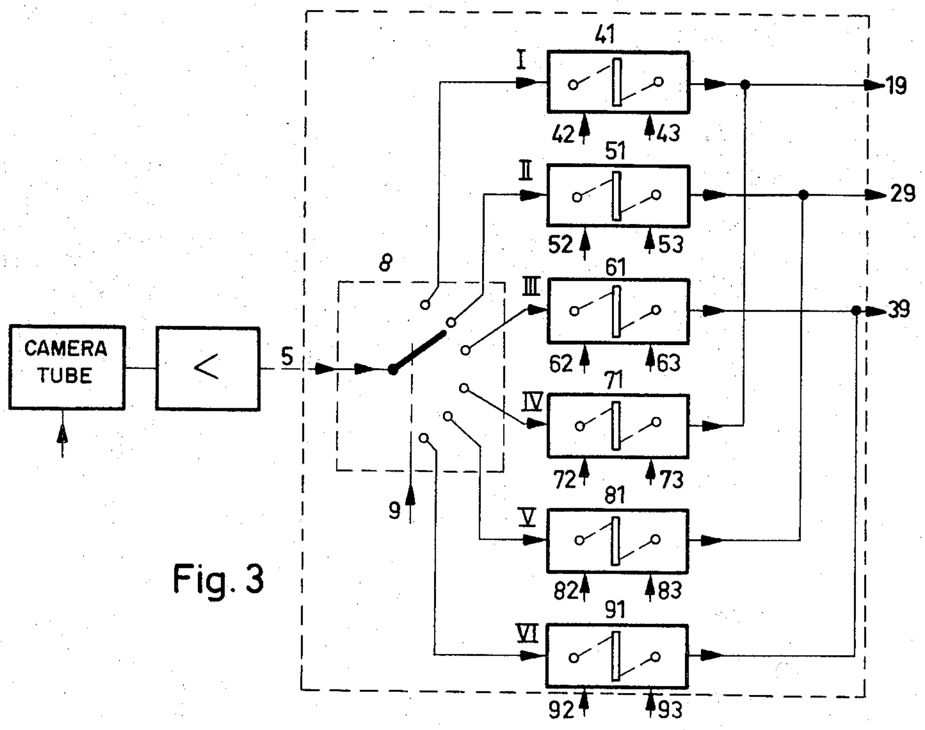
FIG. 3 is an arrangement similar to that of FIG. 1 but wherein two separate storage elements are allocated to each image.
Figure 4:
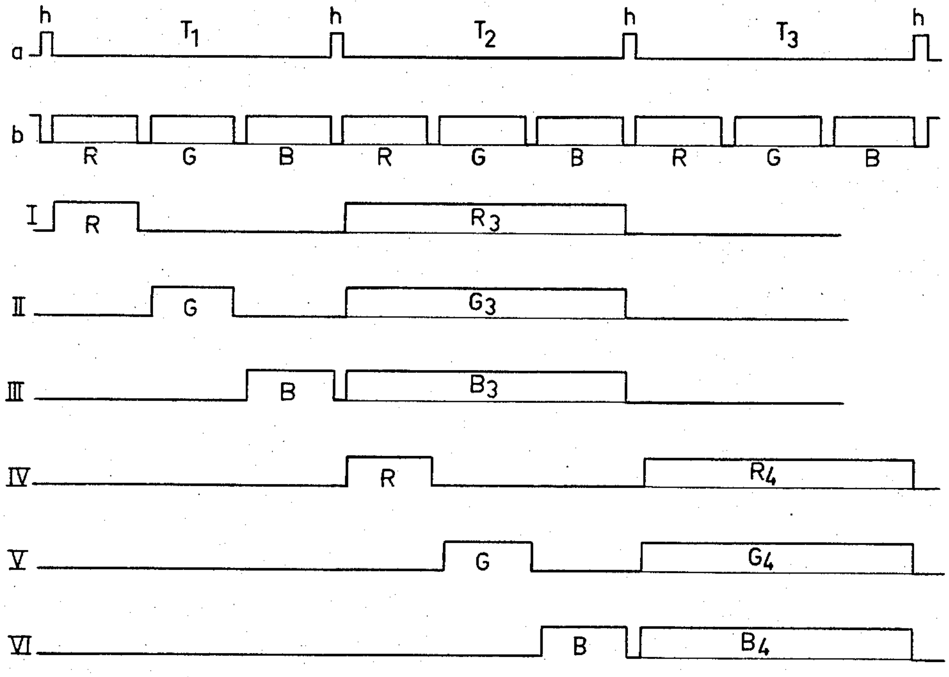
FIG. 4 is a timing diagram showing the signals at different points of the system according to FIG. 3.

FIG. 4 is a timing diagram for the arrangement of FIG. 3. Line *a* shows line intervals $T_1$, $T_2$, $T_3$ of, for example 64 microseconds, which are determined by the standard line synchronization pulses *h*. Line *b* shows the sequential compressed color signals generated by scanning of the photosensitive layer of the camera tube. In each line interval T, three sequential compressed color signals R, G and B are generated, each having a time duration corresponding to one-third of the line interval. Within time period $T_1$ the electronic switch 8 distributes the "red" compressed color signal R to the input of storage element 41 where it is entered into said storage element. Subsequently the "green" compressed color signal G is entered into storage location 51 and "blue" compressed color signal B into storage location 61 (FIG. 4 I—III). In the following line interval $T_2$ subsequent color signals R, G and B are entered into the storage locations 71, 81 and 91 of the second group, respectively.

Contrary to the timing in FIG. 1, the beginning of the write-in and the readout processes do not coincide here, but all three compressed color signals in a group remain stored until the beginning of the subsequent line interval. They are then read out simultaneously during said subsequent time interval. Thus simultaneous color signals $R_3$, $G_3$ and $B_3$ of standard line interval duration are available in the first group of storage elements in subsequent line interval $T_2$ following scanning line interval $T_1$. In a similar manner, the readout of the compressed color signals stored in the second group of storage elements takes place during the further line interval $T_3$ ($R_4$, $G_4$, $B_4$).

As was demonstrated in FIG. 4, double the number of storage elements are required by the arrangement of FIG. 3 as are required by the arrangement of FIG. 1. That is, two groups of storage elements, each having a number of storage elements, corresponding to the number of images on the photosensitive surface of the camera tube must be supplied, because the readout of each group of storage elements, takes place only in the line interval following the write-in of the signals into said storage elements. Thus the storage elements of any group are not available for entry of compressed color signals during the next following line interval.

The storage elements in the arrangement according to FIG. 2 thus also serve the function of delay means, eliminating the need for the latter.

Figure 5:
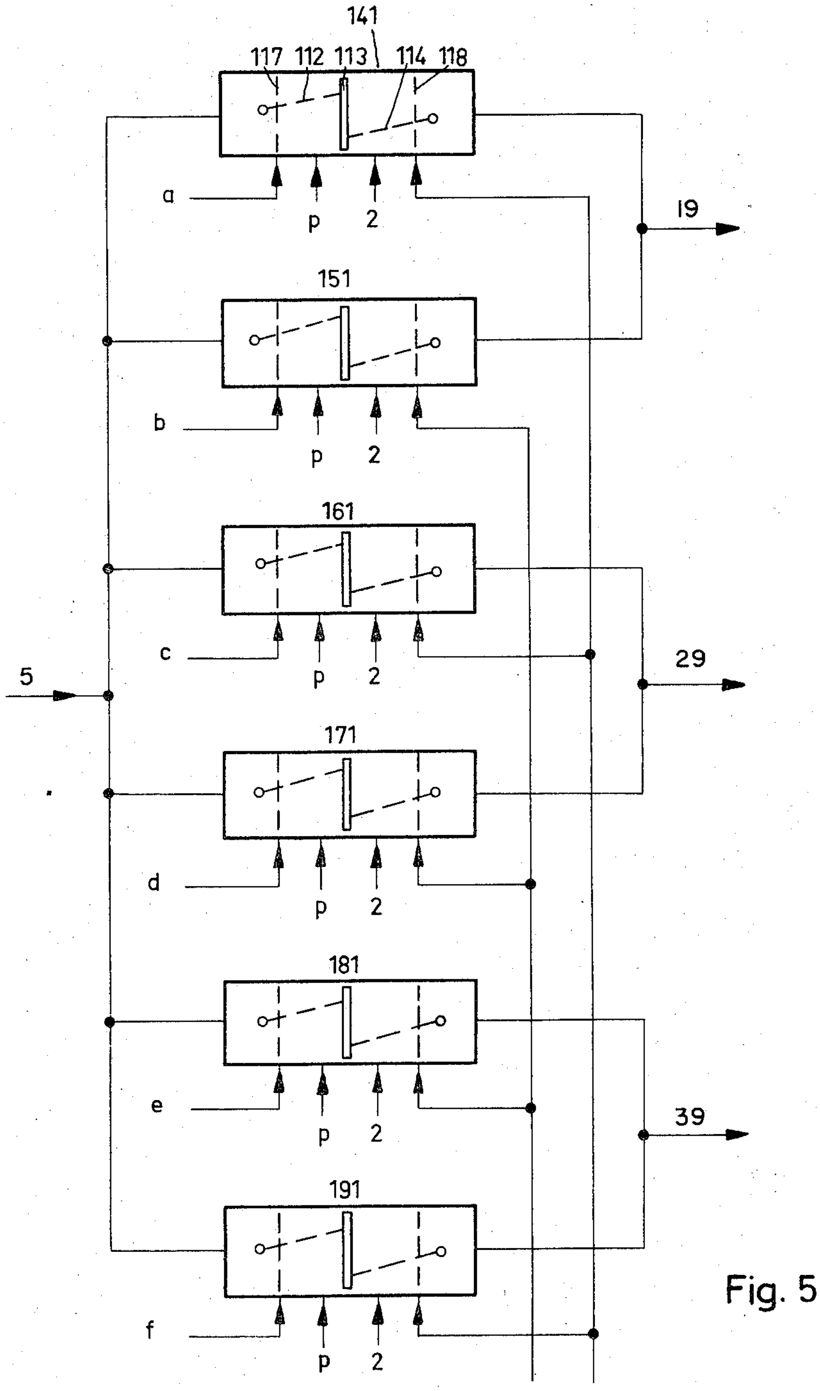
FIG. 5 is an arrangement similar to FIG. 3, but having specially designed line storage elements.
Figure 6:
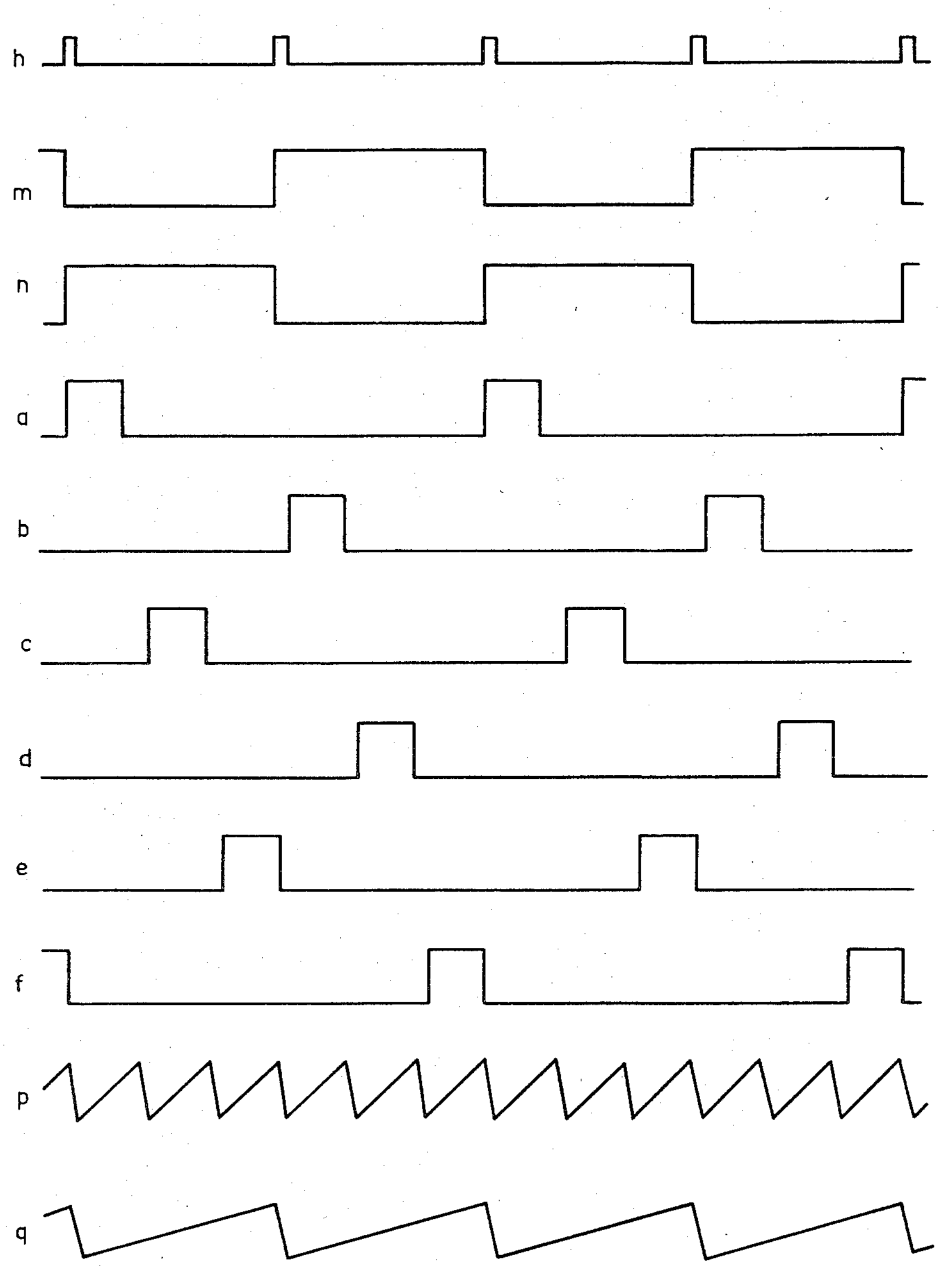
FIG. 6 is a timing diagram showing the pulse sequence for controlling the line storage elements in the arrangement of FIG. 5, as well as the deflection signals for the write and read beams for said line storage elements.

FIG. 5 shows a variation of the arrangement according to FIG. 3 wherein a special construction of the storage elements eliminates the need for the electronic switch 8. Each of these storage elements contains means for impeding or permitting the passage of the electron beam, both for the readout beam 114 and the writing beam 112. These means comprise, for example for storage elements 141 and 151, respectively, control electrodes 117 and 118, respectively, which are adapted to permit or impede the passage of the respective electron beams depending on the beam control voltages applied thereto. FIG. 6 shows the timing of the beam control pulses for permitting the passage of the readout and write-in beams in the individual storage elements, in reference to the line synchronization pulses *h*. Here it is assumed that positive beam control pulses (pulses extending in an upward direction) permit the passage of the electron beam. Lines *a—f* show write beam control pulses having time delays of one-third of a line interval, while lines *m* and *n* show read beam control pulses of line interval duration, which allow passage of the readout beam alternately in the two groups of storage elements. Furthermore, FIG. 6 also shows the deflection *p* for the write-in beam and *q* for the readout beam.

FIGS. 7—10 show a number of possibilities for the generation of the deflection signals (voltages of or currents) for the horizontal deflection required for scanning of the images on the photosensitive layer of the camera tube.

Figure 7:
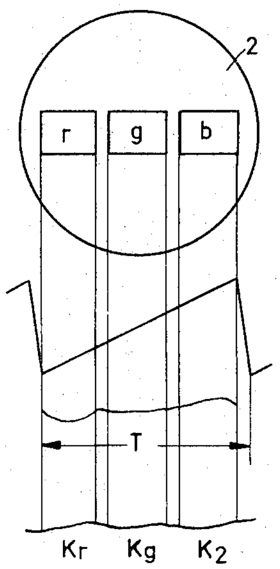
FIG. 7 is a schematic presentation of a method of generating the deflection signals for a television camera wherein the separate images appear next to each other in the direction of the line on the photosensitive layer of said camera.

FIG. 7 shows the photosensitive surface 2 of the camera tube whereon are pictured three images in the *r*, *g* and *b* spectral region, respectively, scanning of all three images within one line interval takes place by scanning all three images sequentially with a scanning beam deflected with the standard horizontal line frequency. The amplitude of the deflection signals corresponds to the sum of the widths of the three images, and also including the spacing between the images. Thus, one line of each of the red, green and blue images is scanned within one-third of the line interval, that is 21.3 microseconds, if the line interval is 64 microseconds.

For an exact correspondence between the color signals and the corresponding image elements in the three images, the deflection would have to be a strictly linear deflection, which is impossible to achieve in practice. For equalization of the unavoidable nonlinearities, a correction signal may be superimposed on the sawtooth deflection signal. This deflection signal may comprise three separately adjustable portions, namely a portion Kr for the red image, a portion Kg for scanning the green image, and a portion Kb for scanning the blue image.

However, it is more advantageous, to carry out the compensation for the non linearity in the scanning in the picture tube within the storage elements. Here the correction must be applied to one-third of the deflection sawtooth only, thus necessitating compensation for a substantially smaller non linearity as opposed to the full deflection period. It is thus possible to achieve an adequate decrease in non linearity in each sector of the deflection sawtooth signal by means of simple (for example sawtooth) correction voltages.

Figure 8:
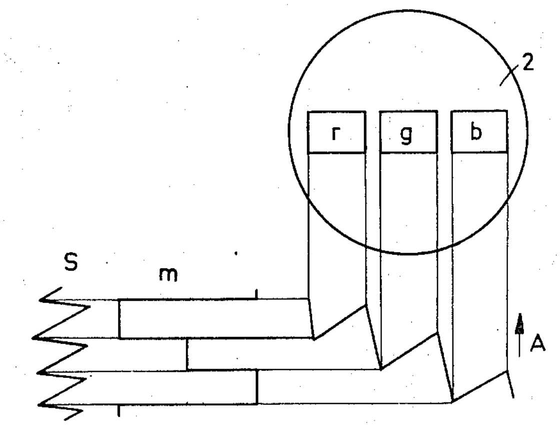
FIG. 8 is a schematic representation of a different method of generating the deflection signals for the image arrangement of FIG. 7.

In FIG. 8 the three color images, *r*, *g* and *b* are also arranged next to each other on the photosensitive surface 2 of the camera tube. Here the generation of the deflection signals takes place by generation of a sawtooth oscillation S having three times the standard horizontal line frequency, and translating each of three sequential periods of this oscillation by means of a superimposed stepwise increasing step voltage or current in the horizontal direction in such a manner that each image *r*, *g* and *b* is scanned sequentially. The advantage of this method lies in the fact that the scanning of the three pictures takes place in a practically identical manner by means of sequential oscillations with three times the standard line frequency and that thus any possible non linearities affect the three images in the same fashion. The disadvantage of this method is that the generation of the deflection signals requires a separate deflection apparatus, having a deflection frequency which is three times the deflection frequency of the deflection signal generators for the standard horizontal line frequencies.

The sequence of the images on the photosensitive layer of the camera is preferably arranged in such a way that the image requiring the highest exactness is situated in the middle and those images for which greater tolerances are admissible appear respectively in the left and the right portion of the photosensitive layer. For example the images may appear in the order red, green and blue in the direction of the line.

Figures 9, 10:
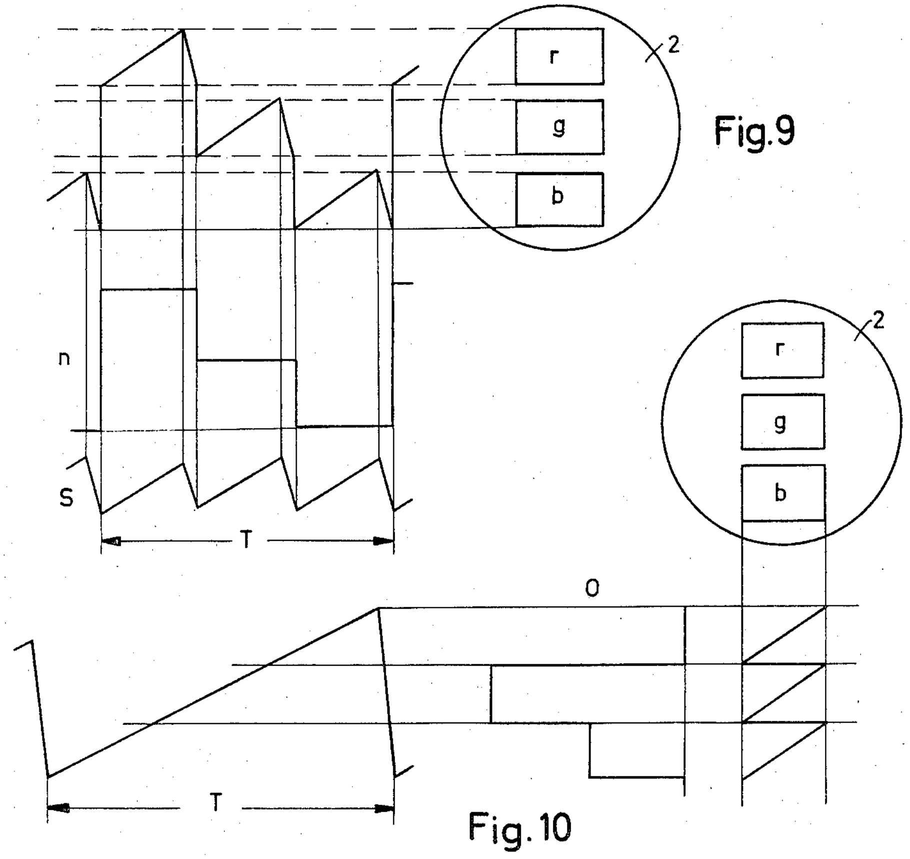
FIG. 9 is a schematic representation of a method of generating the deflection signals for a television camera wherein the images are located one underneath the other in a direction perpendicular to the direction of the line.
FIG. 10 is a schematic representation of a different method of generating the deflection voltages or currents for the image arrangement of FIG. 9.

In FIG. 9 the three images *r*, *g* and *b* are arranged on the photosensitive layer 3 of the camera tube in a direction perpendicular to the line direction, one underneath the other. The deflection in the horizontal direction is accomplished, as it was in FIG. 8, by a sawtooth oscillation *s* having three times the line frequency. As previously three sequential oscillations are moved into the correct positions relative to the three images *r*, *g* and *b* by means of a stepwise increasing step voltage *n* which, this time is in a vertical direction.

Finally, FIG. 10 shows a method by which the deflection signal required for three images *r*, *g* and *b*, arranged one over the other in a direction perpendicular to the direction of the lines, may be derived from a sawtooth oscillator having the standard period T. The amplitude of these oscillations is again approximately three times as great as the width of each *r*, *g* and *b*. By superimposing a stepwise increasing signal *o*, three segments, of the increasing edge of the sawtooth oscillation each having a duration equal to one-third of the line interval are translated relative to each other in a direction perpendicular to the direction of the horizontal lines. Generally a second step voltage signal in the vertical direction is also required. This is not illustrated in the FIG. This is required for fixing the position of the three segments of the sawtooth oscillation to the prescribed values in the vertical direction.

Figure 11:
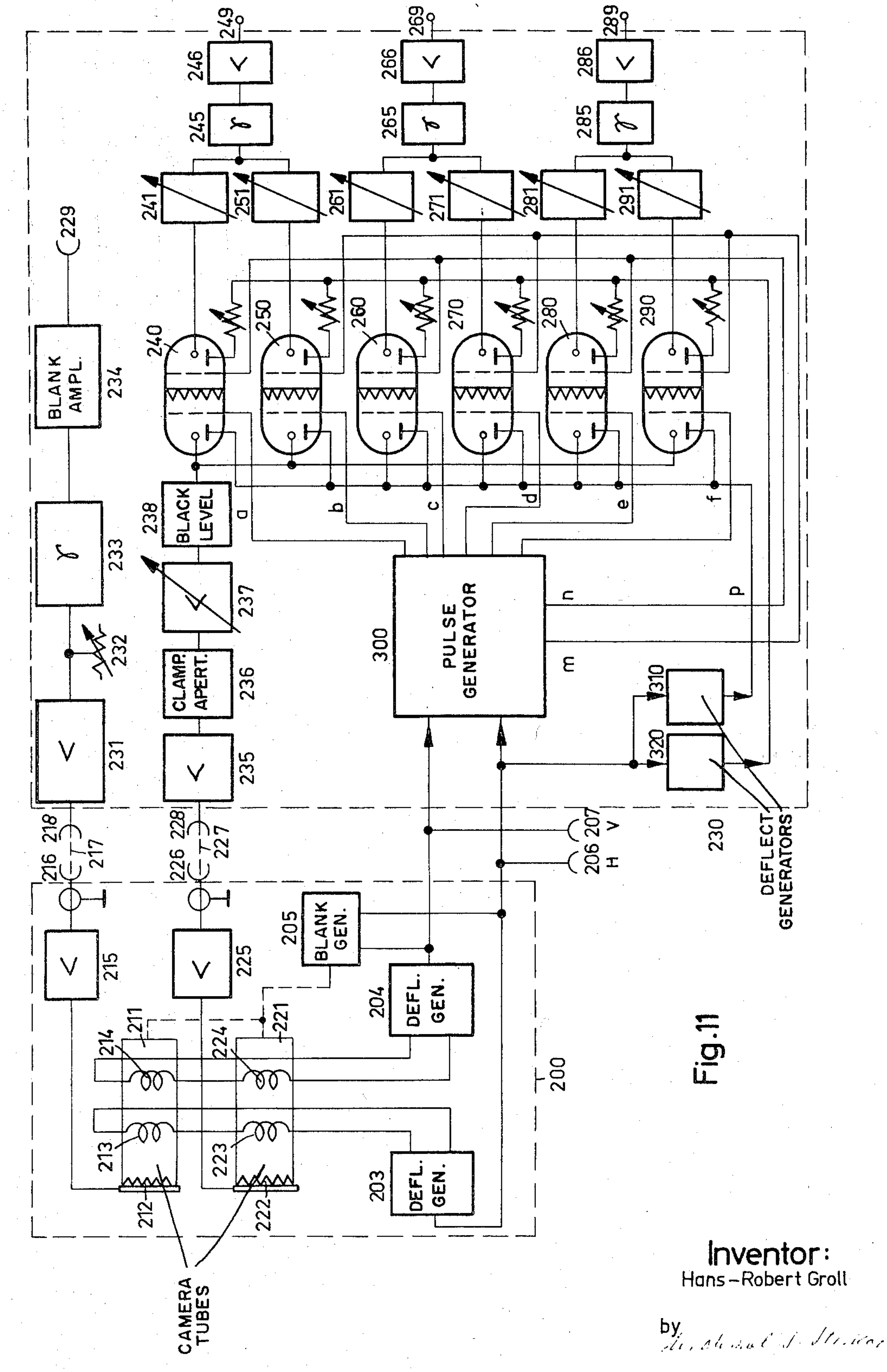
FIG. 11 is the block diagram of a color television camera system operating in accordance with this invention.

FIG. 11 shows a color television camera system which operates according to the method of this invention, in schematic representation as a block circuit diagram. The actual color television camera 200 is equipped with two camera tubes 211 and 221. The tube 211 generates a brightness signal, while the tube 221 generates the color signals according to the present invention. By means of an optical system containing dichroic mirrors or prisms, which is not shown in the FIG., the object to be televised is pictured in three separate images corresponding to three different spectral regions, which are arranged next to each other or one under the other on the photosensitive layer 232 of the camera tube 221. A portion of the light is separated in a conventional fashion by means of a semitransparent mirror or prism before the separation of the light emanating from the object into the three images in different spectral regions, and a panchromatic picture is projected onto the photosensitive layer 212 of camera tube 211, which images occupy the complete usable surface of the photosensitive layer 212. The brightness signal which is generated by scanning of said panchromatic picture is amplified by preamplifier 215 within the camera and is available at connector 216.

The compressed color signals resulting from the scanning of the images on the photo sensitive layer 222 of the camera tube 221 are also amplified in a preamplifier 225 and are available at terminal 226. Further present in the camera are deflection signal generators 203 and 204 for horizontal and vertical deflection respectively and a blanking signal generator 205. These generators are controlled by horizontal frequency and vertical frequency synchronization pulses, respectively, furnished at connectors 206 and 207.

The brightness signal is furnished to terminal 218 of camera amplifier 230 by means of coaxial cable 217 emanating from the connector 216, while the color signals are fed to input 228 of the amplifier 230 by means of a second coaxial cable 227 emanating from terminal 226. In the latter the brightness signal is processed in the usual way by means of an intermediate amplifier 231, a nonlinear amplifier 233 for gradation control (gamma-amplifier) and a blanking amplifier 234 and is available at output 229 as a standard blanked brightness signal. The control 232 serves to adjust the level of the brightness signal.

The signal generated and amplified by camera tube 221 travels from the input connector 228 to an amplifier 235 and travels through a stage 236 which contains a clamping circuit and an aperture corrector. Number 237 is a variable gain amplifier by means of which the level of the signal may be changed, and finally the black level of the signal is brought to the correct value in arrangement 238. Conversion of the sequential color signals with shorter than line interval duration to simultaneous signals of the line interval duration takes place in the same way as shown in FIG. 5 by means of six electrostatic storage elements 240, 250, 260, 270, 280 and 290. The inputs to all of said storage elements are interconnected in parallel and are connected to the last processing stage for the signal emanating from the camera tube 221, namely stage 238. Gating of the write beams for the storage elements is achieved by means of sequences *a*—*f*, which are pictured in FIG. 6 and explained in the description thereof. These pulse sequences are derived from the standard synchronization signal by means of a pulse shaper 300. The deflection voltages of three times the standard line frequency are generated in deflection generator 310 which is synchronized to the standard line synchronization pulse sequence ($p$ in FIG. 6). The two pulse sequences of opposite phase, each of which is operated at half the horizontal line frequency, which are required for gating of the readout beams, are formed in the pulse shaper 300. A deflection signal generator 320 serves to generate the deflection voltages at standard horizontal line frequency which are required for the readout beams ($q$ in FIG. 6). This deflection signal generator 320 is also controlled by line frequency synchronization pulses.

Level adjustors 241, 251, 261, 271, 281 and 291 are provided to equalize the levels of the output signals from the individual storage elements. After level equalization, the outputs of any two corresponding storage elements which store color signals corresponding to the same color are connected together. The thus obtained color signals pass through nonlinear amplifiers 245, 265 and 285 for contrast compensation, and well as limiting amplifiers 246, 266, and 286. Thus, three simultaneous, blanked gamma-contrast corrected color signals are available at outputs 249, 269 and 289 of the camera amplifier.

The color television signal may then be formed by coding from these three color signals and the gamma-corrected blanked brightness signal which is available at terminal 229 of the camera amplifier.

This invention is of course not to be limited to the particular embodiments described. The process according to this invention may also be instrumented in other ways in accordance with the present state of the art.

For the type of arrangement shown in FIG. 3 having six storage elements, in which the readout process only begins after the write-in process has ended, storage elements having one beam instead of two beams as described in this particular embodiment, may be used. Here the electron beam may be used alternately as a write-in beam and a readout beam.

Other storage means which also permit the write-in and readout of signals at different velocities and at different time periods may be substituted for the electrostatic storages described herein. For example special types of delay lines may be used.

A television camera having its own camera tube for the generation of the brightness signal as shown in FIG. 11 may also be constructed in such a way that only two images in different spectral regions are formed and scanned on the camera tube which is used for generation of the color signals, while the third color signal is derived from the brightness signal. This results in decreased equipment requirement and in a higher resolution of the two color signals because of the greater area available for the images.

While the invention has been illustrated and described as embodied in particular color signal generating systems, it is not intended to be limited to the details shown, since various modifications, structural, and circuit changes may be made without departing in any way from the spirit of the present invention.

I claim:

1. For use in a color television camera wherein the time period for scanning a horizontal line is a line interval and wherein said horizontal scanning takes place at a horizontal line frequency, a process for generating color signals comprising, in combination, projecting a plurality of images, each in a predetermined spectral range, of an object to be televised onto the photosensitive surface of a camera tube in said camera; scanning substantially corresponding lines of said plurality of images sequentially in a time period substantially equal to said line interval, thus generating a corresponding plurality of compressed color signals, each having a time duration shorter than said line interval; and converting said sequential compressed color signals into simultaneous color signals each having a time duration substantially equal to said line interval, thus furnishing a plurality of color signals corresponding to said plurality of images for each horizontal line, resulting in full vertical resolution.

2. A process as set forth in claim 1, wherein converting said sequential compressed color signals into simultaneous color signals each having a time duration substantially equal to said line interval comprises the steps of storing each of said compressed color signals in a corresponding storage location, thus furnishing stored color signals; and reading said stored color signals out of said storage locations in such a manner that the readout interval for each storage location is equal to said line interval, thus generating said standard color signals.

3. A process as set forth in claim 2, also comprising the step of writing said compressed color signals into said storage locations; wherein said writing into and reading out of a storage location begin simultaneously; and also comprising the step of delaying said color signals in such a manner for such differing time periods that said color signals are available simultaneously in the subsequent line interval, thus furnishing simultaneous color signals as required for transmission.

4. A process as set forth in claim 2, wherein storing said compressed color signals comprises storing the compressed color signals generated in a first line interval in a first group of storage locations; storing the compressed color signals generated during the subsequent line interval in a second group of storage locations; simultaneously reading out all of said stored signals in said first group of storage locations, over a time period corresponding to said line interval, in said subsequent line interval, thus generating simultaneous color signals, corresponding to a first line of said image; and simultaneously reading out said stored signals in said second group of storage locations, over a time interval corresponding to said line interval, during the line interval following said subsequent line interval, thus generating simultaneous color signals corresponding to a second line of said image.

5. For use in a color television camera wherein the time period for scanning a horizontal line is a line interval and wherein scanning of said horizontal lines takes place at a horizontal line frequency, a system for generating color signals without loss of vertical resolution, comprising, in combination, means for projecting a plurality of images, each in a predetermined spectral range, of an object to be televised onto the photosensitive surface of a camera tube in said camera; means for scanning substantially corresponding lines of said plurality of images sequentially in a total time period substantially equal to said line interval, thus generating a corresponding plurality of compressed color signals, each having a time duration shorter than said line interval; and means for converting said sequential compressed color signals into simultaneous color signals each having a time duration substantially equal to said line interval, thus furnishing simultaneous color signals for each horizontal line, as required for full vertical resolution.

6. A system as set forth in claim 5 wherein said converting means comprise storage means for storing said compressed color signals thus furnishing stored signals; storage write-in means for writing said compressed color signals into said storage means; and storage readout means adapted to readout said stored signals, each in a time period substantially equal to said line interval, thus generating color signals having a time duration equal to said line interval.

7. A system as set forth in claim 6, wherein said storage means comprise a plurality of individual storage elements each having a storage electrode adapted to store signals in the form of electrical charges; wherein said storage write-in means comprise a plurality of first electron beams, each adapted to be modulated with a corresponding one of said compressed color signals; and wherein said readout means comprise a corresponding plurality of second electron beams, each deflected at said horizontal line frequency.

8. A system as set forth in claim 6, wherein said storage means comprise a plurality of capacitors; wherein said storage write-in means comprise first electronic switching means adapted to connect each of said compressed color signals in turn to said capacitors, thus causing said capacitors to be charged correspondingly, the charge on said capacitors thus constituting said stored signals; and wherein said readout means comprise second electronic switching means operated at horizontal line frequency.

9. A system as set forth in claim 6, and also comprising a plurality of delay elements, each adapted to delay an appropriate one of said color signals for such a time period that said color signals are simultaneously available at a predetermined subsequent line interval following said scanning process.

10. A system as set forth in claim 6, wherein said storage means comprise a first and second group of storage elements, each of said groups of storage elements comprising a plurality of storage elements, one for each of said images; also comprising electronic switching means for connecting each of said compressed color signals to a corresponding storage element in said first group of storage means for a given line interval and to said second group of storage elements for the line interval following said given line interval; and wherein said readout means are adapted to readout the signals from said first group of storage elements simultaneously during the write-in time for said second group of storage elements, and are further adapted to readout the signals from said second group of storage elements simultaneously during the write-in time for said for first group of storage elements.

11. A system as set forth in claim 6; wherein said storage means comprise a plurality of individual storage elements, one for each of said images; wherein said write-in means comprise a corresponding plurality of write-in elements; wherein said readout means comprise a corresponding plurality of readout elements; also comprising means for impeding action of said readout or said write-in elements upon receipt of corresponding read or write impeding signals; and means for generating said impeding signals in such a manner that said write-in is effected to corresponding storage elements during said scanning process and said readout takes place during a time interval corresponding to said line interval.

12. A system as set forth in claim 5, wherein said images are located side by side in the direction of a horizontal line on said photosensitive surface; wherein said scanning means comprise a scanning electron beam; and also comprising deflection means for deflecting said scanning electron beam with a frequency equal to said horizontal line frequency and an amplitude corresponding to a width equal to the sum of the widths of the individual images and the spaces therebetween.

13. A system as set forth in claim 5, wherein said images are located side by side in the direction of the horizontal line on said photosensitive surface; wherein said scanning means comprise a scanning electron beam; also comprising a deflection system for said scanning beam having first deflection means adapted to generate a sawtooth voltage with an amplitude corresponding to the width of a single image and a frequency equal to the product of the horizontal line frequency and the number of said plurality of images; and second deflection means adapted to generate a step signal having a constant amplitude during the scanning time of each individual image.

14. A system as set forth in claim 5, wherein said images are located one underneath the other on the photosensitive surface, in a direction perpendicular to said horizontal line; wherein said scanning means comprise a scanning electron beam; and also comprising a deflection system for said scanning beam having first deflection means adapted to generate a sawtooth signal whose sawtooth frequency is the product of said horizontal line frequency and the number of said plurality of images; and a step voltage whose amplitude remains constant during the scanning of individual images and whose change in amplitude from the scanning of one individual image to the scanning of the subsequent individual image is equal to the vertical distance between corresponding lines of said images.

15. A system as set forth in claim 5, also comprising a second camera tube; means for projecting a panchromatic picture onto the photosensitive surface of said camera tube; and means for generating a brightness signal as a function of said panchromatic image.